Sept. 13, 1932.　　　C. E. MAYNARD　　　1,876,712
TEMPERATURE MEASURING DEVICE FOR RUBBER WORKING MACHINERY
Filed Nov. 9, 1927
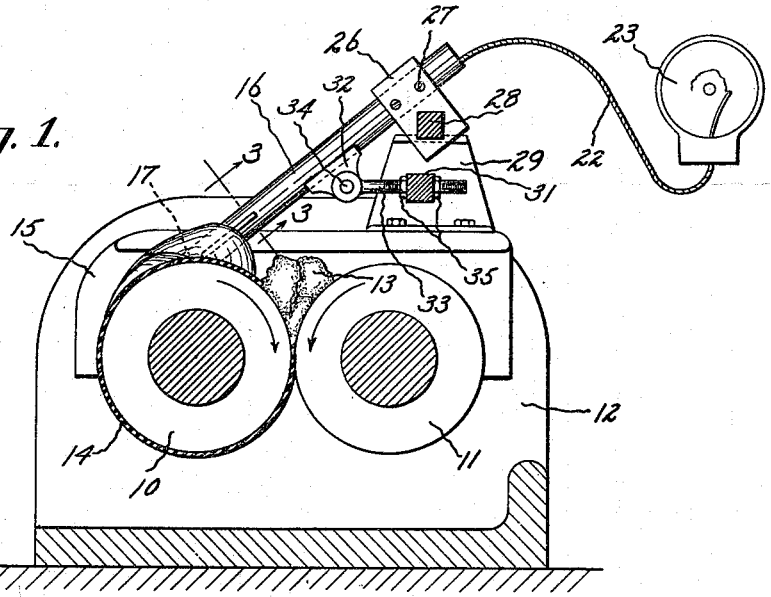
Fig. 1.
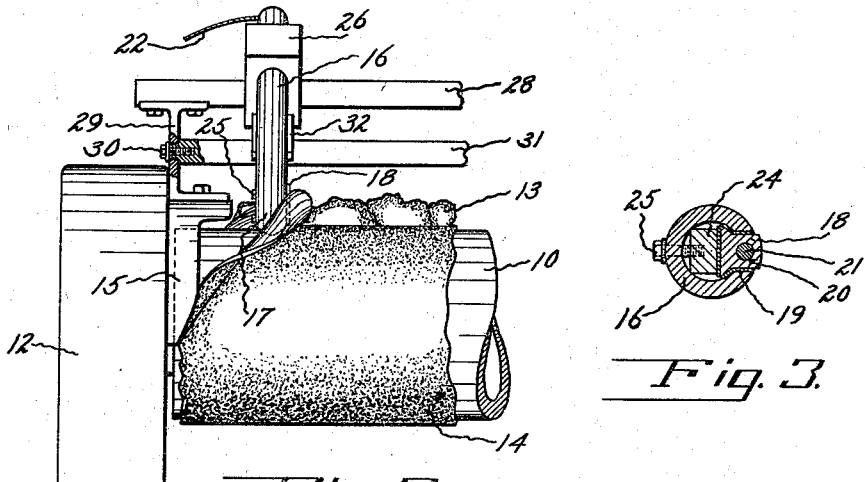 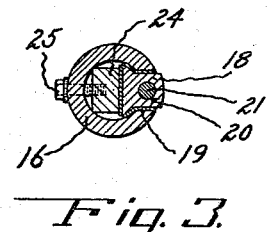
Fig. 2.　　　Fig. 3.
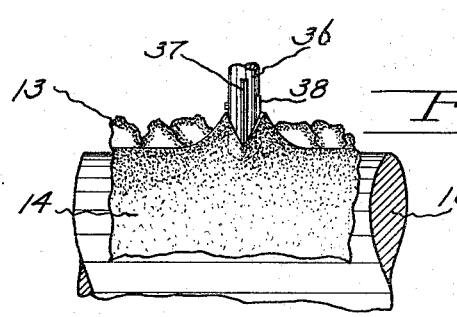
Fig. 4.
INVENTOR.
Charles Edgar Maynard
BY
Edward C. Naylor
ATTORNEY.

Patented Sept. 13, 1932

1,876,712

UNITED STATES PATENT OFFICE

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS

TEMPERATURE MEASURING DEVICE FOR RUBBER WORKING MACHINERY

Application filed November 9, 1927. Serial No. 232,078.

My invention relates to apparatus for measuring the temperature of rubber stock while it is being worked and is applicable to the usual breaking down, mixing or warming mills, calenders or other rubber working machinery. The object of the invention is to get a correct indication of the temperature of the rubber independently of the temperature of the adjacent portions of the rubber working machinery.

Referring to the drawing,

Fig. 1 is a cross-section through a rubber working mill with my device attached, Fig. 2 is a fragmentary side elevation looking from the left in Fig. 1, Fig. 3 is a section on line 3—3 of Fig. 1, and Fig. 4 is a fragmentary elevation corresponding to Fig. 2 but showing a modification.

The mixing mill has been shown as of the usual type having rolls 10 and 11 mounted upon a frame 12 and driven in opposite directions, generally at slightly different speeds, by gearing and a source of power which have not been illustrated. A bank of rubber 13 is placed between the rolls and works out into a sheet 14 which passes around one roll, here indicated as the roll 10. End guides 15 act in the usual manner to keep the rubber sheet and the bank 13 from working out over the ends of the rolls.

In order to secure an indication of the temperature of the rubber, apart from the temperature of the roll 10 on which it is supported, I employ a plow for separating the rubber from the roll, comprising a tube 16 having its end 17 shaped to correspond to the surface of the roll. Into one side of the tube is fitted a temperature responsive device. As shown this comprises an aluminum block 18 having heat insulation 19 separating it from the tube, a hole 20 in the aluminum block being fitted with a bulb or thermo-couple 21, or any desired heat measuring device, which is connected by a flexible shaft or electric wire 22 to a recording or indicating instrument 23. The aluminum block 18 is held in position within the tube by being flared out along its inner side and by means of a spacer 24 located by bolts 25.

The tube 16 is mounted in a holder 26 by screws 27. The holder is located upon a square shaft 28 mounted upon bearings 29 secured to the frame of the mill. Pivoted at 30 to the bearings 29 is a square shaft 31 extending from one side of the mill to the other. A lug 32 projecting downwardly from the tube carries a screw 33 pivoted to it at 34. A screw passes through a hole in the shaft 31 and is held in adjusted position by nuts 35.

When the mill rolls are rotated in the direction of the arrows in Fig. 1 the rubber sheet 14 will be turned over by the end 17 of the plow so that the rubber is separated from the roll 10 and bears against the aluminum plate 18. The end of the plow is preferably adjusted by means of the nuts 35 so that it is very closely spaced to the roll. This prevents the rubber going under the plow and still does not develop frictional heat between the plow and roll which might disturb the accuracy of the reading. A further precaution is taken by means of the heat insulation 19 so that the conduction of heat from the rubber into the aluminum block is unaffected by conditions elsewhere. Aluminum has been chosen for the block on account of its high heat conductivity, but, of course, other metals having this same property can be substituted.

Instead of mounting the plow at one end of the mill rolls as in Fig. 2 it may be desirable to place it at the center or at some other point. In this case the tube 16 is replaced by a tube 36 having a knife 37 at that side against which the rubber is carried by the roll 10. A block 38 similar in construction to the block 18 is secured at one side in position to be contacted with by the rubber. In this case the rubber will be temporarily cut, will pass on both sides of the tube 36 and will again be united when it passes back into the bank 13.

Having thus described my invention, I claim:

1. The combination of a rubber working roll, a temperature responsive device spaced from the roll, and means for temporarily deflecting rubber from the roll and into contact with the device.

2. The combination of a rubber working roll, a plow acting to raise from the surface of the roll a portion of the rubber being worked, and a temperature responsive device mounted in the surface of the plow in position to contact with the rubber.

3. The combination of a rubber working roll, a plow acting to raise from the surface of the roll a portion of the rubber being worked, and a temperature responsive device mounted in the surface of the plow and heat insulated therefrom.

4. A device for measuring the temperature of rubber which comprises a moving support on which the rubber is carried, a temperature responsive device adapted to be mounted adjacent said support and means associated with the device adapted to temporarily deflect a portion of the rubber from said support and into operative contact with the device.

CHARLES EDGAR MAYNARD.